US006963542B2

(12) United States Patent
Manthoulis et al.

(10) Patent No.: US 6,963,542 B2
(45) Date of Patent: Nov. 8, 2005

(54) WEB BASED CAPACITY MANAGEMENT (WBCM) SYSTEM

(75) Inventors: Orestis Manthoulis, Sausalito, CA (US); Peter Wong, Newark, CA (US); Frederick Armanino, San Antonio, TX (US); Raghvendra G. Savoor, Walnut Creek, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 118 days.

(21) Appl. No.: 10/345,106

(22) Filed: Jan. 15, 2003

(65) Prior Publication Data

US 2004/0136326 A1 Jul. 15, 2004

(51) Int. Cl.[7] .............................................. G06F 11/00
(52) U.S. Cl. ...................... 370/252; 370/466; 370/467; 709/236; 709/246
(58) Field of Search ............................. 370/241.1, 246, 370/252, 401, 402, 465, 466, 467, 476; 709/236, 709/246

(56) References Cited

U.S. PATENT DOCUMENTS

| | | | |
|---|---|---|---|
| 4,975,836 A | 12/1990 | Hirosawa et al. ........... 718/100 |
| 5,359,599 A * | 10/1994 | Destouesse et al. ........ 370/390 |
| 6,256,676 B1 * | 7/2001 | Taylor et al. ............... 709/246 |
| 6,512,824 B1 | 1/2003 | Hsieh et al. ................. 379/230 |
| 2002/0136369 A1 * | 9/2002 | Robohm et al. ......... 379/88.17 |
| 2002/0152303 A1 * | 10/2002 | Dispensa .................... 709/224 |
| 2002/0168054 A1 * | 11/2002 | Klos et al. ................. 379/1.04 |
| 2003/0195892 A1 * | 10/2003 | Dhanda ....................... 707/100 |

\* cited by examiner

Primary Examiner—Dang Ton
Assistant Examiner—Shick Hom
(74) Attorney, Agent, or Firm—Jeffrey G. Toler; Toler, Larson & Abel, LLP

(57) ABSTRACT

The disclosure generally relates to a system and method of processing and presenting data associated with telecommunication elements. In a particular embodiment, the system includes a first input to receive a first set of element management system data from a first element management system, a second input to receive a second set of element management system data from a second element management system, and integration logic to produce a combined set of data based on the first set of element management system data and the second set of element management system data. The system also includes data reformatting logic to produce a combined set of data having a common data format.

19 Claims, 4 Drawing Sheets

WEB BASED CAPACITY MANAGEMENT (WBCM) SYSTEM

BACKGROUND

1. Field of the Invention

The present application relates generally to a system and method of managing a network having telecommunication system elements 2. Description of the Related Art Telecommunication system management and operations involve many activities that are time-consuming, tedious, manual, and inefficient. Examples of such activities include service provisioning and inventory management of the many telecommunication elements involved in providing service to a large geographic region. Current techniques to manage inventory and to determine network deployment use databases and other operational support systems that are constructed based on manually inputted and updated engineering job orders as each telecommunication element is deployed or modified. With such systems, the status of network equipment is based on equipments lists, such as from purchase orders. With the large number of telecommunication elements and the manual and tedious nature of data input, the system, data inaccuracies and the costs of maintaining such a system is high. In addition, the data needed to monitor and manage the network, such as traffic and performance data, is provided by different legacy systems from different vendors, resulting in additional difficulties with maintenance and operations of the telecommunication systems.

Accordingly, there is a need for an improved system and method of managing a network having telecommunication system elements.

SUMMARY

The present disclosure is generally directed to a system and method of processing and presenting data associated with telecommunication elements. In a particular embodiment, the system comprises a first input to receive a first set of element management system data from a first element management system, a second input to receive a second set of element management system data from a second element management system, and integration logic to produce a combined set of data based on the first set of element management system data and the second set of element management system data.

In another embodiment, the method includes receiving a first set of element management system data from a first element management system, the first element management system associated with a first set of telecommunication elements; receiving a second set of element management system data from a second element management system, the second element management system associated with a second set of telecommunication elements; and producing a combined set of data based on the first set of element management system data and based on the second set of element management system data.

DETAILED DESCRIPTION OF THE DRAWINGS

Figure 1:
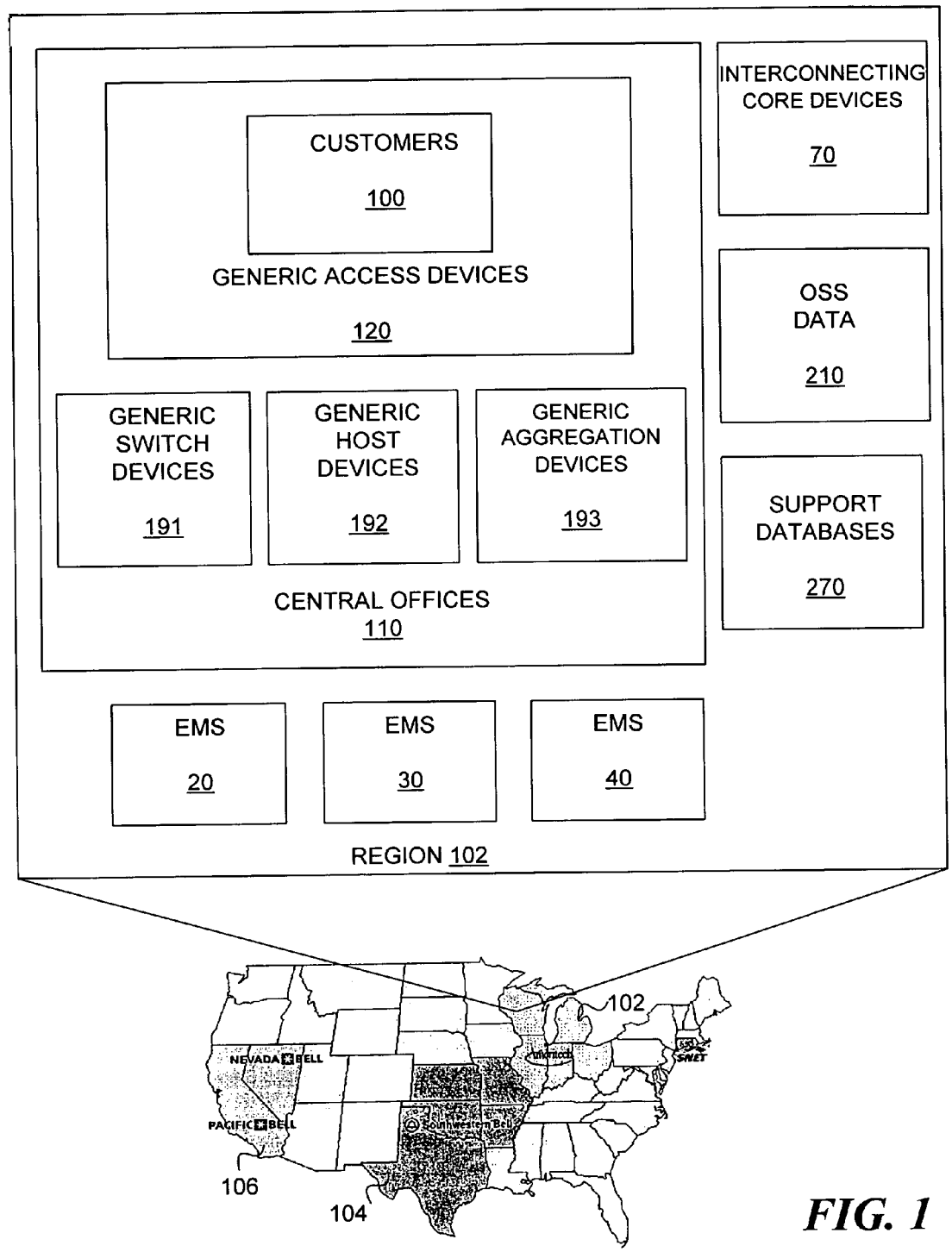
FIG. 1 is a block diagram that illustrates an embodiment of a generic system.

Referring to FIG. 1, an illustrated embodiment of a system is shown. The system includes central telecommunications offices 110, a telecommunication regions 102, 104, 106, interconnecting core devices 70, support databases 270, and operations and support data 210. The central offices 110 include generic switch devices 191, such as telephony switches, generic host devices 192, such as central office terminals, and generic aggregation devices 193, such as optical concentrator devices (OCD). The central offices 110 also include generic access devices 120 that service telecommunication customers 100. An example of a generic access device 120 is a remote terminal located near a plurality of customers where the remote terminal is coupled to a far-end optical concentrator device via a fiber-optic or other data transport communication line.

The example serviced geographic region 102 includes a plurality of different element management systems (EMS) 20, 30, and 40. The different EMS systems support a different group of telecommunication elements. For example, the EMS system 20 may support a first group of generic access devices and associated host devices. Similarly, the EMS system 40 may support a second group of generic access devices and associated generic host devices. The EMS system 30 may support a group of other devices, such as a group of generic aggregation devices. The example region 102 is a particular geographic telecommunication service coverage region for the Midwest portion of the United States. Other illustrated regions include a Southwest region 104 and a Pacific region 106. The illustrated regions may be associated with different brands. For example, the region 102 is associated with the Ameritech brand, the Southwest region 104 is associated with the Southwestern Bell brand, and the Pacific region 106 is associated with the Pacific Bell and the Nevada Bell brand. The system disclosed herein is applicable to other telecommunication service coverage regions, whether smaller or larger than the illustrated geographic regions described.

Figure 2:
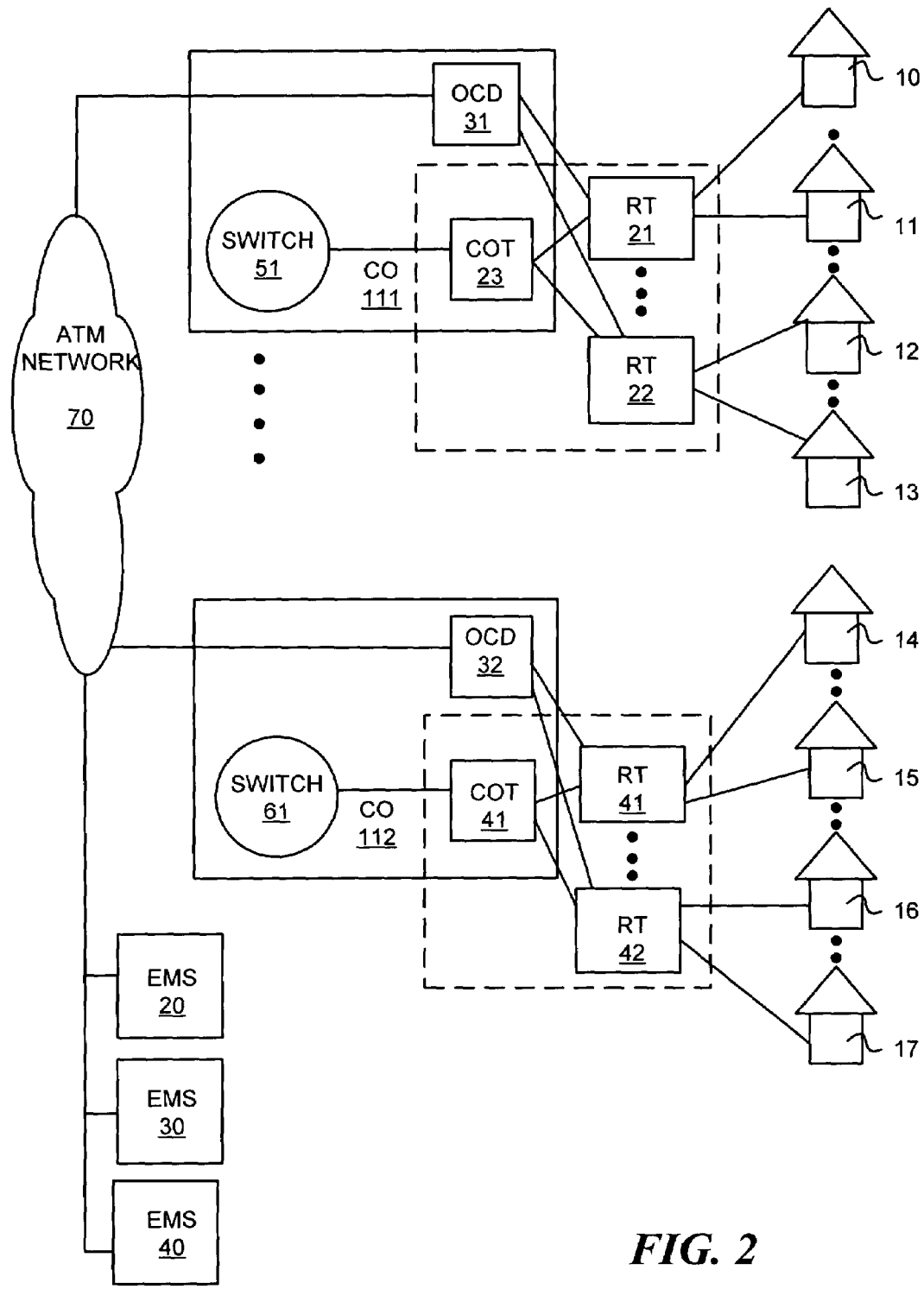
FIG. 2 is a general diagram that illustrates an embodiment of a particular telecommunication system configuration.

Referring to FIG. 2, a general diagram is provided to demonstrate how the various EMS systems 20, 30, 40 may be interconnected with various other telecommunication elements. As shown, a sample system configuration includes a first central office facility 111 and a second central office facility 112. The first central office facility 111 includes a telecommunications switch 51, a central office terminal (COT) 23, and an optical concentrator device (OCD) 31. The OCD 31 is coupled to an external data network, such as an ATM network 70.

The COT 23 is coupled to a first remote terminal 21 by a first telecommunication line and to a second remote terminal 22 by a second telecommunication line. The OCD 31 is similarly coupled to both the first remote terminal 21 and the second remote terminal 22 via data links. The first remote terminal 21 is coupled through a plurality of different telecommunication lines to a plurality of customers, such as residential/business facilities 10, 11. The second remote terminal 22 is coupled through a plurality of different telecommunication lines to a plurality of different customers, such as other residential/business facilities 12, 13.

The second central office facility 112 includes a telecommunications switch 61, a central office terminal (COT) 41, and an optical concentrator device (OCD) 32. The OCD 32 is coupled to the ATM network 70. The COT 23 is coupled to a third remote terminal 21 by a third telecommunication line and to a fourth remote terminal 22 by a fourth telecommunication line. The OCD 32 is coupled to the third and fourth remote terminals 41, 42 by data lines. The third remote terminal 41 is coupled through a plurality of different telecommunication lines to a plurality of customers, such as residential/business facilities 14, 15. The fourth remote terminal 42 is coupled through a plurality of different telecommunication lines to a plurality of different customers, such as other residential/business facilities 16, 17.

In this particular illustrative configuration, the first EMS 20 supports the first remote terminal 21, the second remote terminal 22, and the COT 23. The second EMS 30 supports the OCDs 31 and 32. The third EMS 40 supports the COT 41, the third remote terminal 41, and the fourth remote terminal 42. The EMS systems 20, 30, 40 are typically provided by the same vendors/manufacturers of the associated supported telecommunication elements. Thus, a vendor of the first and second remote terminals 21, 22 provides a specific EMS 20 that communicates data and can be used for operations, monitoring, and maintenance of the supported remote terminals 21, 22. Within a particular geographic region that includes many different telecommunication elements provided by different vendors, a plurality of different EMS systems, each with different vendor-specific interfaces may be deployed. An example of a representative EMS system is the Access Management System (AMS) provided by Alcatel, Inc.

Figure 3:
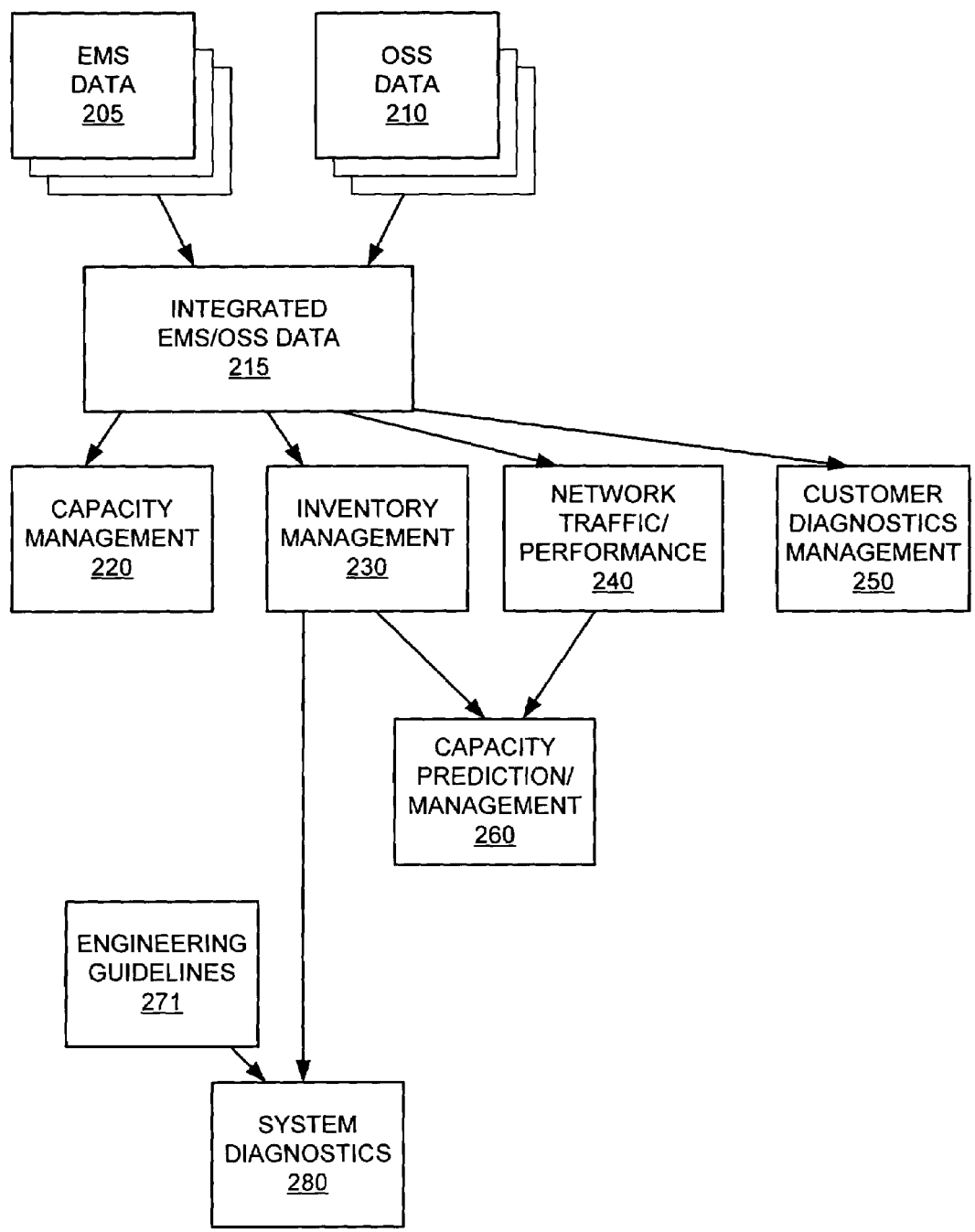
FIG. 3 is a functional block diagram that illustrates telecommunication actions that may be taken with respect to the systems of FIG. 1 and 2.

Referring to FIG. 3, a functional description of a system that provides certain telecommunication actions with respect to the systems of FIGS. 1 and 2 is disclosed. The illustrated system includes EMS data 205, OSS data 210, and integrated EMS/OSS data module 215. The EMS data 205 is data that is provided by an EMS, such as EMS 20, 30, and 40. The OSS data is data from an operations and support system associated with a telecommunication system, such as a telephony switch or group of switches. The integrated EMS/OSS data module 215 is a combination of vendor-specific EMS data from different vendor EMS systems and generic OSS data from operations support systems. The combined EMS/OSS data 215 is formatted in a vendor-transparent common format for enhanced service provider use. An example of the common data format is comma delimited ASCII, which may be stored in a central database according to a defined business model.

The data may be organized and presented using a network systems engineering-defined rule base combining desired business and presentation models. In a particular illustrative embodiment, configuration data is extracted separately from each vendor's type of network element at least once per week. As a specific example, performance and statistical data maybe extracted daily for one hour or fifteen minute time intervals with five minute peaks, according to the level of detail needed to assess proper performance. The specific time intervals for data collection can vary. The central database is then updated with this information. The user interface may be a web browser interface that includes a number of different view levels, ranging from a summarized company level view down to a specific port level view. Additional examples of view levels are regional level, market level, wire center level, system level, terminal level, distribution area level, channel bank level, card level, and virtual interface group level. Each view level includes different ways to display the data. For example, at the company level, a user may want to see the total number of network elements deployed, the total number of customers in service, the total number of outages, or the average data speeds being provided to customers. Other data view types include an overview, specific details of identified network elements, routes, and channel banks. The presentation data can also be viewed for a selected region or distribution area. The same type of data presentation may be viewed for voice and data service.

Once the EMS data 205 and OSS data 210 has been integrated and provided in a useable format, the integrated EMS/OSS data 215 has many uses. For example, the integrated EMS/OSS data 215 may be used to provide a real-time capacity management function 220, inventory management 230, network traffic/performance 240, and customer diagnostics and measurement 250. In addition, based on the common inventory management and network traffic performance monitoring that is provided for different vendor equipment within a selected region, capacity prediction and management 260 may also be provided for such region. Further, based on suitable engineering guidelines and policies 271, overall system diagnostics 280 may also be performed on telecommunication elements within the region.

Rules can be applied to the integrated data to characterize the data and to define appropriate thresholds. Examples of data characterization include defining the number of ports in service or calculating a customer's loop length. Thresholds specify that a certain configuration, traffic, or performance number has been reached, and are defined and customized to fit the needs of a particular user. For example, a planner may need to know when a channel bank reaches 50% capacity to allow time to order more equipment. An engineer may need to know when that same channel bank reaches 90% capacity in order to study its performance. Users of the system can be notified via email or other notification methods when a particular threshold has been exceeded (e.g. bandwidth utilization, VCC exhaust, DA exhaust, bit error rates, line characteristics, etc.). When a monitored threshold is exceeded, a red or yellow alarm may be displayed to provide a visual indication to a system user, resulting in efficient provisioning and monitoring of network elements.

For example, the first set of EMS data includes information about the Network Elements that it is associated with. The available data includes the system name, the IP address, the administrative state, the configuration type, and the version of that telecommunication element. In addition, the detail information about all the banks in the unit are provided, including all the cards in each slot of the system and each port of each card. The name, the type, the CLEI code, the serial number, its primary service state, and secondary service name is the type of additional information that is available per card and per port.

Figure 4:
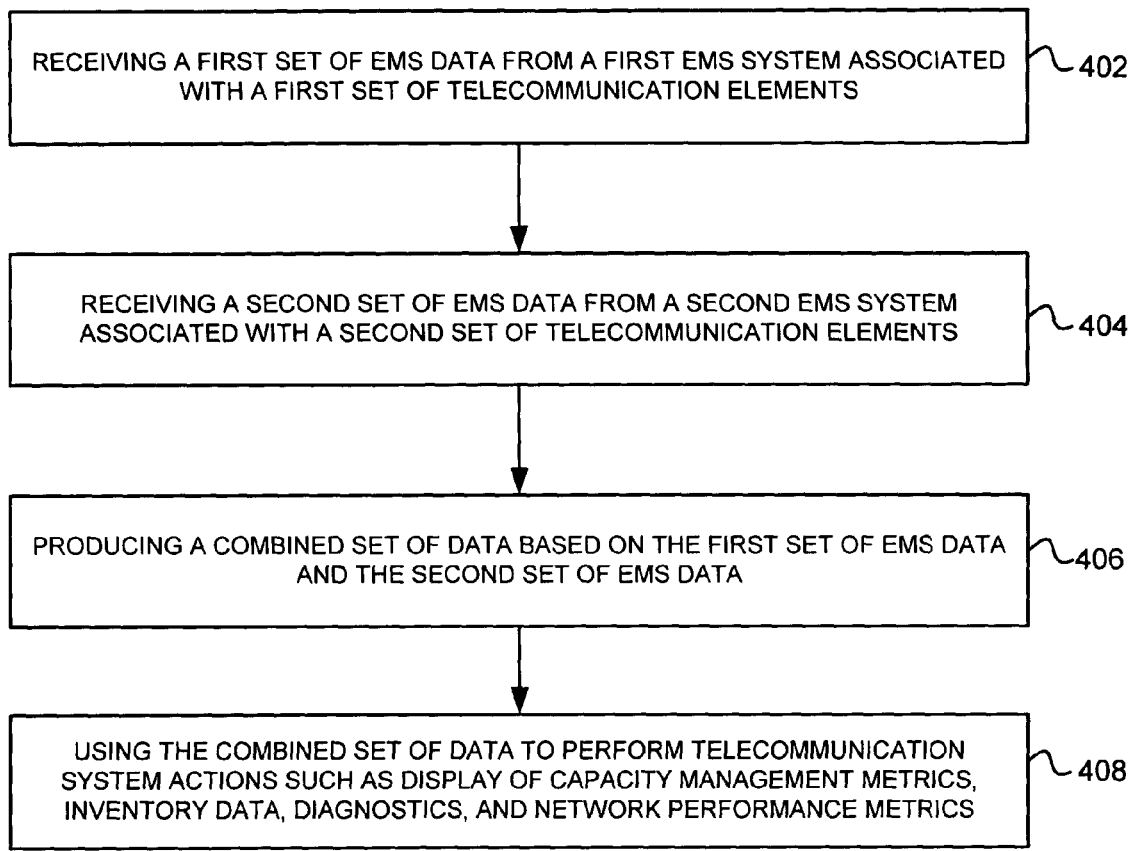
FIG. 4 is a flow chart that illustrates operation of an embodiment of a representative system.

An example of the data format, in this case in comma delimited ASCII format, is provided:

NODE,RT2,RT,NGDLC,DLC#-4024,(w_A: 09.01.02, b_A: 00.00.00, w_B: 09.01.02, b_B: 00.00.00)
NODE,RT3,RT,NGDLC,DLC#-4024,(w_A: 09.01.02, b_A: 00.00.00, w_B: 09.01.02, b_B: 00.00.00)
NODE,RT4,RT,NGDLC,DLC#-4024,(w_A: 09.01.02, b_A: 00.00.00, w_B: 09.01.02, b_B: 00.00.00)
BANK,DLC#-4024,COT,CCB
BANK,DLC#-4024,COT-1,CBB
BANK,DLC#-4024,RT1,CCB
EQUIPMENT,DLC#-4024,COT-ACU,ACU, SLPQ0B76AE,1982201,IS-NR,

EQUIPMENT,DLC#-4024,COT-MTI,MTI,
 SLTE103BAA,667855,IS-NR,
EQUIPMENT,DLC#-4024,COT-CCB,CCB,2609415,IS-
 NR,SEA
EQUIPMENT,DLC#-4024,COT-OTE-A,OTU,
 SLTRCB4BAB,2677726,IS-NR,
EQUIPMENT,DLC#-4024,COT-OTE-B,OTU,
 SLTRCB4BAB,2677726,IS-NR,
EQUIPMENT,DLC#-4024,COT-OTW-A,OTU,
 SLTRCB4BAB,2677726,IS-NR,

A second set of data can be available from other EMS systems, or an OSS system. For example, from an internal OSS system, information is collected that is associated with the customer in each port of the telecommunication element described above. The OSS data can provide the Circuit ID of the customer, its telephone number, the date the service that the customer requested was activated, the profile of the service that was requested, etc Referring to FIG. 4, an embodiment of a method of producing and using the integrated ESS/OSS data is shown. A first set of EMS data from a first EMS system associated with a first set of telecommunication elements is received, at 402. A second set of EMS data from a second EMS system associated with a second set of telecommunication elements is received, at 404. A combined set of data based on the first set of EMS data and based on the second set of EMS data is produced, at 406. The combined set of data is then used to perform telecommunication system actions, such as display of capacity management metrics, inventory data, diagnostics, and network performance metrics, at 408. While the above method refers to the combined set of EMS data from two or more EMS systems, it should be understood that other data may also be combined with the EMS data to produce an integrated data set, such as data from supporting telecommunication systems, such as the OSS data from OSS systems and other support databases described herein. In addition, the combined set of data may be reformatted into a common data format that may be different than the data format of the first set of EMS data and the second set of EMS data. The reformatted data may be more easily used as a platform to perform the various desired telecommunication system actions. The reformatted data may be presented to users in a user-friendly format, such as via a web browser.

The disclosed method of collecting inventory and other equipment data using EMS systems directly provides a more accurate view of inventory and service provisioning compared to the alternative of deducing network deployment from engineering construction job orders. The disclosed method also reduces user training and saves time and costs of accessing information from a variety of separate legacy support systems. In addition, data accuracy is improved by querying the equipment installed in the network rather than inferring status of network equipment based on equipment lists from purchase orders. In addition, by combining data from different vendor equipment, the network operator is provided an integrated view of a heterogeneous multi-vendor network and an end-end view of circuit elements.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
 a first input to receive a first set of element management system data from a first element management system;
 a second input to receive a second set of element management system data from a second element management system;
 integration logic to produce a combined set of data based on the first set of element management system data and the second set of element management system data;
 data reformatting logic to reformat the first set of element management system data and the second set of element management system data to produce reformatted data with a common data format;
 a network performance management module, the network performance management module responsive to the integration logic, the network performance management module to monitor and display network performance metrics for telecommunication elements associated with the first element management system and the second element management system, the network performance metrics including average data speeds;
 an inventory management module responsive to the integration logic, and,
 a capacity prediction module, the capacity prediction module responsive to data from the inventory management module and responsive to the network performance metrics provided by the network performance management module.

2. The system of claim 1, wherein the combined set of data is derived from a combination of vendor-specific element management system data and operations and support systems data associated with a customer including a customer telephone number.

3. The system of claim 1, wherein the capacity management module is configured to monitor and display capacity management metrics for telecommunication elements associated with the first element management system and the second element management system, and wherein the common format includes ASCII data.

4. The system of claim 1, wherein the inventory management module is configured to monitor and display inventory data for telecommunication elements associated with the first element management system and the second element management system.

5. The system of claim 1, further comprising a diagnosis module, the diagnosis module responsive to the integration logic, the diagnosis module to diagnose trouble conditions of telecommunication elements associated with the first element management system and the second element management system.

6. The system of claim 1, further comprising a system diagnosis module responsive to the inventory management module, the system diagnosis module further responsive to engineering guidelines corresponding to telecommunication elements associated with the first element management system and with the second element management system.

7. The system of claim 1, wherein the first element management system is associated with a first set of telecommunication elements and the second element management system is associated with a second set of telecommunication elements.

8. The system of claim 7, wherein the first set of telecommunication elements include a plurality of generic access devices, at least one of the generic access devices comprising a remote terminal coupled to a far-end optical concentrator device, and wherein the second set of telecommunication elements include a plurality of generic switch devices or host aggregation devices.

9. The system of claim 7, wherein the first set of telecommunication elements includes a plurality of generic host devices and a plurality of generic access devices and wherein the second set of telecommunication elements includes a plurality of generic switch or aggregation devices.

10. The system of claim 9, wherein the first set of telecommunication elements support a first geographic region associated with a first brand name and the second set of telecommunication elements support a second geographic region associated with a second brand name.

11. The system of claim 1, further comprising a third input to receive a first set of operations and support data from a first operations and support system and wherein the integration logic produces the combined set of data based on the first set of operations and support data in addition to the first set of element management system data and the second set of element management system data.

12. The system of claim 1, further comprising a web browser interface that includes a regional level view, a market level view, a channel bank level view, and a card level view.

13. A method of processing data associated with telecommunications elements, the method comprising:
   receiving a first set of element management system data from a first element management system, the first element management system associated with a first set of telecommunication elements;
   receiving a second set of element management system data from a second element management system, the second element management system associated with a second set of telecommunication elements;
   producing a combined set of data based on the first set of element management system data and based on the second set of element management system data;
   performing data reformatting on the first set of element management system data and the second set of element management system data to produce reformatted data with a common data format;
   monitoring and displaying network performance metrics including average data speeds of the first set of telecommunications elements and the second set of telecommunication elements;
   monitoring inventory data for the first set of telecommunication elements and for the second set of telecommunication elements; and
   providing capacity prediction metrics based on the network performance metrics and the inventory data.

14. The method of claim 13, further comprising receiving operations and support data including customer telecommunications service data associated with at least one of the first set of telecommunications elements.

15. The method of claim 13, further comprising evaluating the combined set of data to determine capacity management metrics for the first set of telecommunication elements and the second set of telecommunication elements and displaying the capacity management metrics for the first and second sets of telecommunication elements.

16. The method of claim 13, further comprising using the combined set of data in connection with diagnosing trouble conditions of telecommunication elements associated with the first element management system and the second element management system.

17. The method of claim 13, further comprising monitoring and displaying network performance metrics for telecommunication elements associated with the first element management system and the second element management system.

18. The method of claim 13, wherein the first set of telecommunication elements include a plurality of generic access devices and a plurality of genetic host devices and wherein the second set of telecommunication elements include a plurality of generic switch devices or generic aggregation devices.

19. The method of claim 13, wherein the combined set of data is based on operations and support data in addition to the first set of element management system data and the second set of element management system data.

* * * * *

UNITED STATES PATENT AND TRADEMARK OFFICE
CERTIFICATE OF CORRECTION

PATENT NO.        : 6,963,542 B2  
APPLICATION NO.   : 10/345106  
DATED             : November 8, 2005  
INVENTOR(S)       : Orestis Manthoulis et al.

Page 1 of 1

It is certified that error appears in the above-identified patent and that said Letters Patent is hereby corrected as shown below:

In the Claims section, column 8, line 33, "genetic" should be changed to --generic--.

Signed and Sealed this

Eighth Day of August, 2006

JON W. DUDAS  
*Director of the United States Patent and Trademark Office*